UNITED STATES PATENT OFFICE.

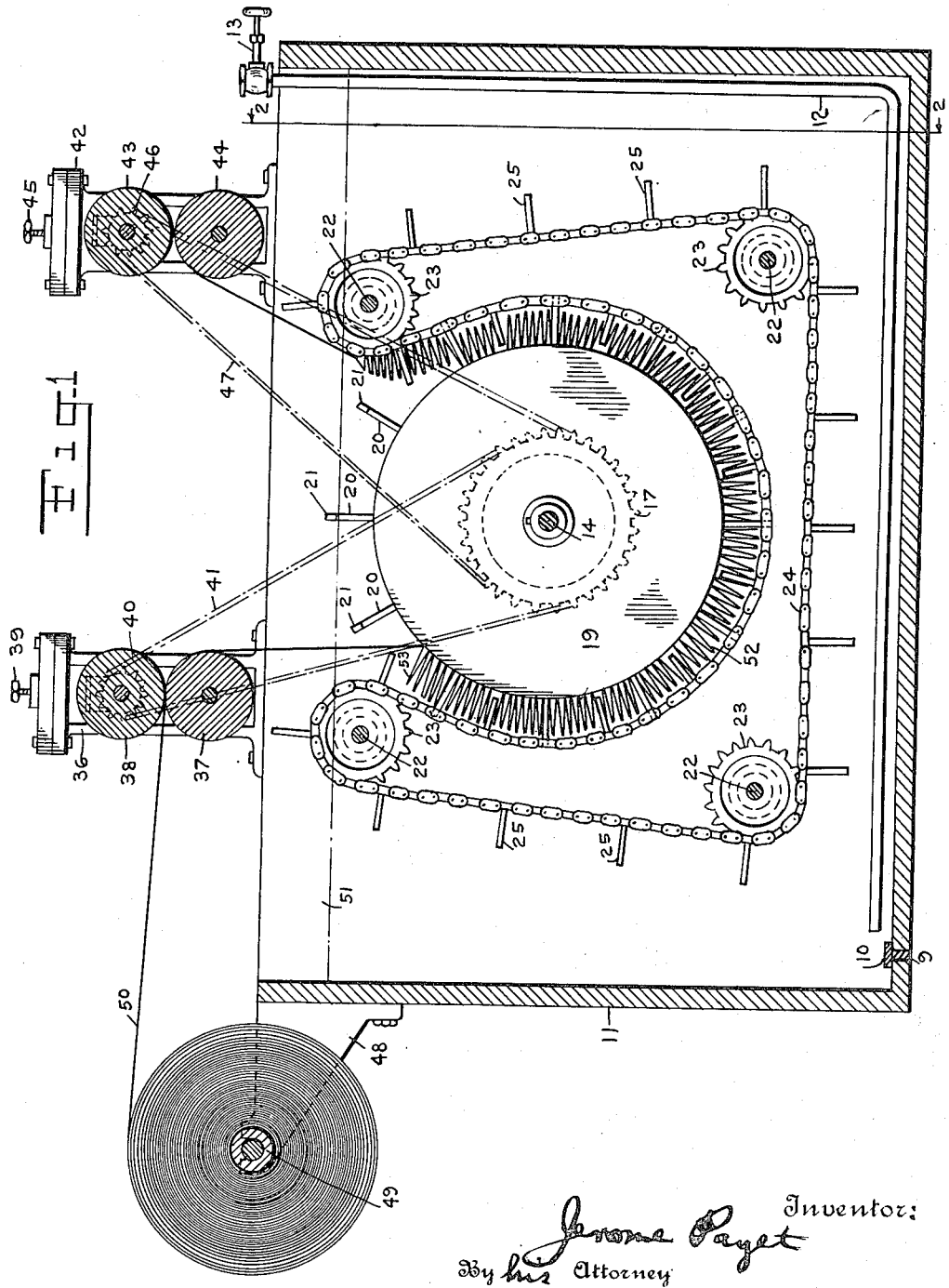

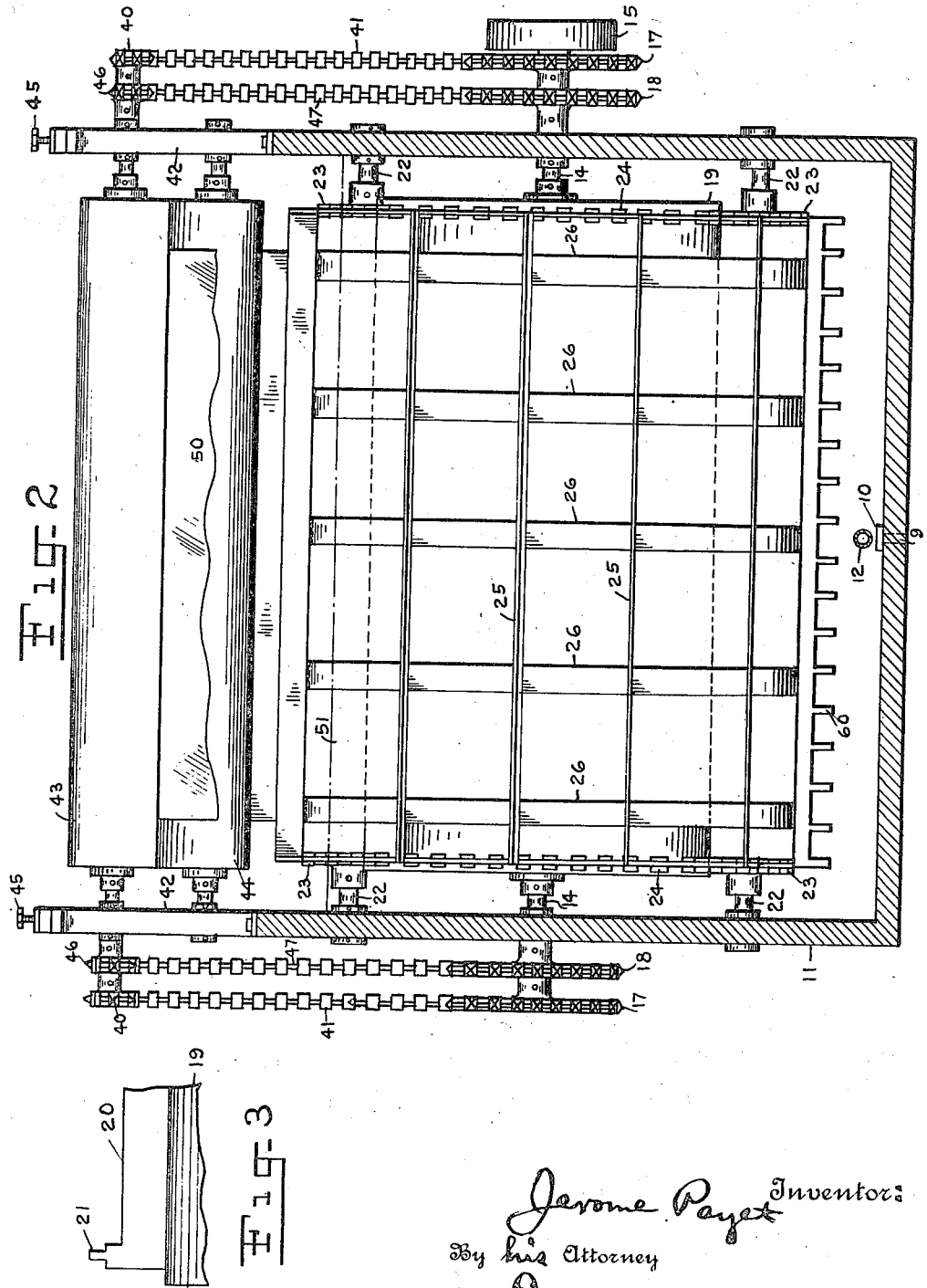

JEROME PAYET, OF CLIFTON, NEW JERSEY.

APPARATUS FOR CLEANING FABRICS.

1,246,993.  Specification of Letters Patent.  Patented Nov. 20, 1917.

Application filed June 22, 1917. Serial No. 176,361.

*To all whom it may concern:*

Be it known that I, JEROME PAYET, a citizen of the United States, and a resident of Clifton, in the county of Passaic and State of New Jersey, have invented certain new and useful Improvements in Apparatus for Cleaning Fabrics, of which the following is a specification.

My invention relates to apparatus for treating and cleaning fabrics, as, for instance, for the "boiling off" of silk and the like, and has for one of its principal objects to provide such a machine which shall be simple in construction, and efficient, thorough, and automatic of operation.

The invention consists in the novel construction, arrangement and combination of various devices, elements and parts, as shown in the accompanying drawings and fully described in this specification.

In the said drawings, Figure 1 is a longitudinal vertical section of my apparatus; Fig. 2 is a transverse section taken on the line 2—2 of Fig. 1; and Fig. 3 is a detail view to be hereinafter described.

In carrying my invention into effect in the embodiment thereof which I have selected for illustration in the accompanying drawings and description in this specification, I provide a suitable tank or vat 11, adapted to contain heated water or any solution with which the fabric is to be treated. The liquid in the tank may be heated by means of a steam pipe 12 extending thereinto, which steam pipe is provided with a suitable stop-cock 13. An outlet opening 9 may be provided in the bottom of the tank, which opening is normally closed by means of a plug 10.

Extending transversely through the tank, near its center, and projecting from each side is a shaft 14, having rigidly mounted thereon a pulley 15 (see Fig. 2) by means of which the entire mechanism is adapted to be driven. This shaft 14 also carries a sprocket gear 17 and 18 on the outside of each side of the tank.

Rigidly mounted on the shaft 14 inside the tank I provide a drum 19. This drum may, if desired, be watertight, in order to decrease the amount of water or solution necessary to fill the tank, in which case it may be found advisable, in order to reduce friction upon the bearings of the shaft 14, to so weight the drum 19 that its specific gravity will approximate that of the surrounding liquid. Secured at intervals to and extending the length of the drum 19 are bars 20, each bar bearing at each end a finger 21. (See particularly Fig. 3).

Mounted in the tank 14 are a number of shafts 22, each shaft bearing near each end a sprocket 23. Endless sprocket chains 24—one near each side of the tank, pass over these wheels 23, and are adapted to be driven by means of the fingers 21 on the bars 20. Secured to and extending transversely of the chains 24, connecting the chains on opposite sides of the machine, are bars 25, similar to the bars 20 but provided with no fingers. Secured to these bars 25 are endless belts 26, running approximately parallel to the chains 24. The belts 26, chains 24, and bars 25 together form an endless apron adapted to be driven as above mentioned, by the fingers 21. If desired, the shafts 22 may be provided with pulleys intermediate the sprockets 23, upon which the belts 26 may run, as an additional support for said belts.

Mounted on the tank 11 near one end are supports 36, in which are journaled rollers 37 and 38. The roller 38 is provided with screws 39, whereby its pressure upon the roller 37 may be regulated at will. The roller 38 is provided at each end with a sprocket 40, by which it is adapted to be driven by chains 41 passing around these sprockets 40 and around the sprockets 17 on the shaft 14. At the other end of the tank I provide similar devices comprising supports 42, rollers 43 and 44, adjusting screws 45, sprockets 46, and chains 47 by means of which the rollers 43 and 44 are adapted to be driven by means of the sprockets 18 on the shaft 14.

At one end of the tank I provide brackets 48, adapted to support a reel 49, from which may be unrolled the fabric to be treated, which I have designated 50.

The operation of my invention is as follows:

The reel 49, carrying the fabric 50, is placed in the brackets 48. The end of the fabric is then passed between the rollers 37 and 38, which are adjusted by the screws 39, and then led downward between the drum 19 and the endless apron. It will be observed that the cross-bars of the apron and those of the drum alternate with each other. The fabric is passed between the apron and the drum by rotating the shaft 14, which operates the drum directly and the apron indirectly by means of the fingers 21. While passing between the drum and apron, the fabric is doubled upon itself, as shown at 52. After emerging from between drum and apron, the fabric is led upward and between the rollers 43 and 44, which are adjusted by means of the screws 45. The tank is filled with suitable liquid, as indicated at 51, and this liquid may be kept heated by means of steam in the pipe 12.

The apparatus may then be driven by power applied to the pulley 15. The apron, being driven directly from the drum moves at a corresponding angular speed with the periphery thereof, but the friction rollers 37, 38, 43 and 44 are geared so as to rotate more rapidly than the drum and apron. After the fabric is passed between the rollers 37 and 38, it drops downward upon one of the bars of the drum or apron, and, as the bar moves more slowly than the fabric, the fabric is doubled up thereupon as shown at 53, and passes between the drum and apron in this condition, which results in its being immersed in the liquid for a much longer time than would otherwise be the case. This doubling or folding up of the fabric also provides that there shall be ample slack in the same as it passes through the liquid, thus preventing any possibility of stretching or tearing the fabric. The projections, provided at intervals on the drum and apron, prevent the fabric from dragging. As the fabric emerges from between the drum and apron, it is straightened out and carried off by the pull of the rollers 43 and 44, which move at a faster rate than the drum and apron.

As the apron is driven directly from the drum, it is impossible for the cross-bars of the apron and the cross-bars on the drum to become disarranged with relation to each other.

The advantages of my invention will be obvious from what has been above set forth concerning its construction and mode of operation. I do not limit myself to the exact form shown and described, as it will be evident that this form is capable of being modified in various ways, without departing from the spirit and scope of my invention. For instance, the driving mechanism, instead of being applied to the drum shaft, as shown and described, might if desired be applied to any of the four shafts carrying the apron, thus driving the drum from the apron instead of driving the apron from the drum. It will also be evident that the members 20 and 25 need not, as shown in the drawings, be solid bars, but might, for instance, comprise a base bar having fingers 60 extending therefrom at suitable intervals. Such a modified form of bar is shown at the bottom of Fig. 2.

Having thus described my invention, what I claim as new and desire to secure by Letters Patent is as follows:

1. In an apparatus for cleaning fabric, the combination with a tank; of a rotating drum in said tank provided with lateral projections adapted to engage with fabric passed around said drum, a moving apron in said tank provided with lateral projections, and means adapted to feed fabric betwen said drum and said apron.

2. In an apparatus for cleaning fabric, the combination with a tank; of a rotating drum in said tank provided with lateral projections adapted to engage with fabric passed around said drum, a moving apron in said tank provided with lateral projections, means adapted to feed fabric between said drum and said apron, and means adapted to remove fabric from between said drum and apron.

3. In an apparatus for cleaning fabric, the combination with a tank; of a rotating drum in said tank provided with lateral projections adapted to engage with fabric passed around said drum, means adapted to drive said drum, a moving apron in said tank, and a pair of rollers operatively connected with said driving means and adapted to feed fabric between said drum and said apron at a rate more rapid than the movement of said drum and apron.

4. In an apparatus for cleaning fabric, the combination with a tank; of a rotating drum in said tank provided with lateral projections adapted to engage with fabric passed around said drum, means adapted to drive said drum, a moving apron in said tank, a pair of rollers connected with said driving means and adapted to feed fabric between said drum and said apron at a rate more rapid than the movement of said drum and apron, and means adapted to remove fabric from between said drum and apron at a rate more rapid than the movement of said drum and apron.

5. In an apparatus for cleaning fabric, the combination with a tank; of a rotating drum in said tank provided with lateral projections adapted to engage with fabric passed around said drum, a moving apron in said tank provided with lateral projections, and means adapted to feed fabric between said drum and said apron at a rate more rapid than the movement of said apron.

6. In an apparatus for cleaning fabric, the combination with a tank; of a rotating drum in said tank provided with lateral projections adapted to engage with fabric passed around said drum, a moving apron in said tank provided with lateral projections, means adapted to feed fabric between said drum and said apron at a rate more rapid than the movement of said drum and apron, and means adapted to remove fabric from between said drum and apron at a rate more rapid than the movement of said drum and apron.

7. In an apparatus for cleaning fabric, the combination with a tank; of a rotating drum in said tank, a moving apron in said tank provided with projections rigidly attached thereto and adapted to engage with fabric between said drum and said apron, and means adapted to feed fabric between said drum and said apron.

8. In an apparatus for cleaning fabric, the combination with a tank; of a rotating drum in said tank, a moving apron in said tank provided with projections rigidly attached thereto and adapted to engage with fabric between said drum and said apron, means adapted to feed fabric between said drum and said apron, and means adapted to remove fabric from between said drum and apron.

9. In an apparatus for cleaning fabric, the combination with a tank; of a rotating drum in said tank, a moving apron in said tank, and devices adapted to positively engage with said apron and to move said drum and apron at corresponding angular speeds.

10. In an apparatus for cleaning fabric, the combination with a tank; of a rotating drum in said tank, a moving apron in said tank, and devices operatively connecting said drum and apron and positively engaging with said apron whereby they may be moved one by the other at the same angular speeds.

11. In an apparatus for cleaning fabric, the combination with a tank; of a rotating drum in said tank, fingers on said drum, and a moving apron in said tank having portions adapted to be engaged by said fingers.

12. In an apparatus for cleaning fabric, the combination with a tank; of a rotating drum in said tank, fingers on said drum, and a moving apron comprising chains adapted to be engaged by said fingers, and cross pieces connecting said chains.

13. In an apparatus for cleaning fabric, the combination with a tank; of a rotating drum in said tank; fingers on said drum, and a moving apron comprising chains adapted to be engaged by said fingers, cross-pieces connecting said chains, and belts connecting said cross-pieces.

14. In an apparatus for cleaning fabric, the combination with a tank; of a rotating drum in said tank, a moving apron in said tank, means adapted to positively engage with said apron and to drive same at the same angular speed as said rotating drum, said moving apron comprising a plurality of sprocket chains and a plurality of crosspieces connecting said chains, and a plurality of shafts mounted in said tank, said shafts being provided with sprocket wheels upon which said chains are adapted to run.

15. In an apparatus for cleaning fabric, the combination with a tank, of a rotating drum in said tank, a moving apron in said tank driven by means on said rotating drum; said moving apron comprising a plurality of sprocket chains, a plurality of cross-pieces connecting said chains, and a belt connecting said cross-pieces; and a plurality of shafts mounted in said tank, said shafts being provided with sprocket wheels upon which said sprocket chains are adapted to run, and with a pulley adapted to support said belt.

16. In an apparatus for cleaning fabric, the combination with a tank; of a rotating drum in said tank provided with lateral bars having fingers extending therefrom, an apron in said tank provided with lateral projections, and means adapted to feed fabric between said drum and apron.

17. In an apparatus for cleaning fabric, the combination with a tank; of a rotating drum in said tank provided with lateral bars having fingers extending therefrom, a moving apron in said tank provided with lateral projections, means adapted to feed fabric between said drum and apron, and means adapted to remove fabric from between said drum and apron.

18. In an apparatus for cleaning fabric, the combination with a tank; of a rotating drum in said tank provided with lateral projections, an apron in said tank provided with lateral bars having fingers extending therefrom, and means adapted to feed fabric between said drum and apron.

19. In an apparatus for cleaning fabric, the combination with a tank; of a rotating drum in said tank provided with lateral projections, an apron in said tank provided with lateral bars having fingers extending therefrom, means adapted to feed fabric between said drum and apron, and means adapted to remove fabric from between said drum and apron.

In witness whereof I have hereunto signed my name this 14th day of June, 1917.

JEROME PAYET.